United States Patent [19]

Rampel et al.

[11] 4,071,978
[45] Feb. 7, 1978

[54] WINDOW ARRANGEMENT WITH SLIDING PANE

[75] Inventors: Hans Rampel, Eicha; Peter Hess; Herbert Becker, both of Coburg, all of Germany

[73] Assignee: Metallwerk Max Brose & Co., Coburg, Germany

[21] Appl. No.: 707,385

[22] Filed: July 21, 1976

[30] Foreign Application Priority Data

Aug. 22, 1975 Germany .............................. 2537536

[51] Int. Cl.² ............................................. E05F 11/48
[52] U.S. Cl. ....................................... 49/348; 49/503; 49/440
[58] Field of Search ................................. 49/501–503, 49/374, 375, 372, 376, 377, 227, 348

[56] References Cited

U.S. PATENT DOCUMENTS

| | | | |
|---|---|---|---|
| 1,657,480 | 1/1928 | Moesta | 49/502 X |
| 2,132,104 | 10/1938 | Froeliger | 49/377 Y |
| 2,260,997 | 10/1941 | Ledwinka | 49/376 |

FOREIGN PATENT DOCUMENTS 2,419,519  4/1974  Germany .............................. 49/348

*Primary Examiner*—Kenneth Downey
*Attorney, Agent, or Firm*—Hans Berman

[57] ABSTRACT

The sliding window in the door of an automotive vehicle is movably guided between a longer and a shorter glass run channel and in a guide groove of a guide member spacedly aligned in the direction of window movement with the channel shortened to accomodate a lock element on the door. Movement of the plane into and out of the groove is facilitated by a flaring orifice of the groove.

2 Claims, 3 Drawing Figures

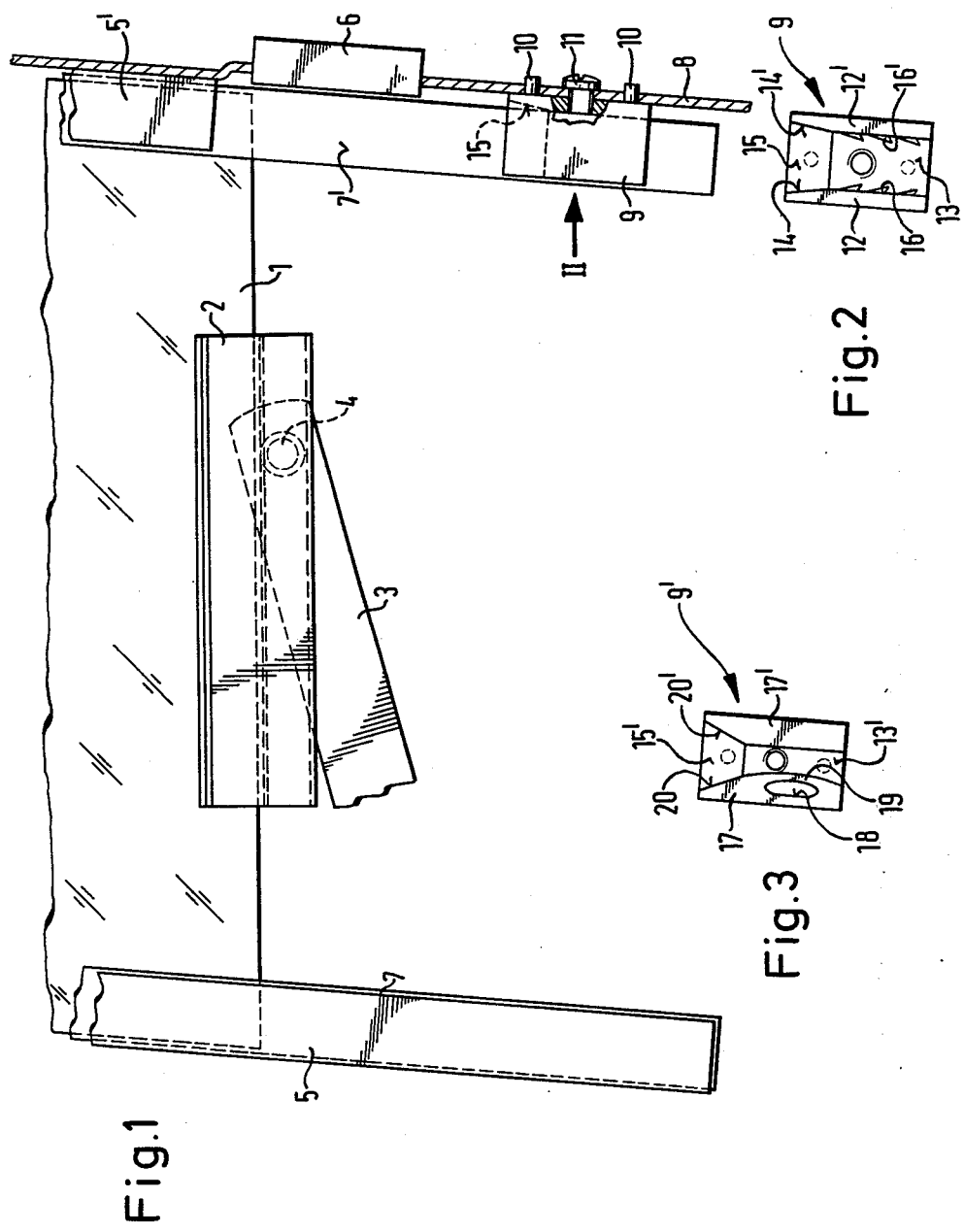

WINDOW ARRANGEMENT WITH SLIDING PANE

This invention relates to sliding windows, and particularly to a window arrangement in which a window pane is guided in two channels elongated in a common direction and spaced transversely of that direction.

Typical of the window arrangements with which this invention is concerned are the window panes on the doors of automotive vehicles which can be raised and lowered by means of a regulator mechanism and are guided laterally in glass run channels. Precise lateral guiding of such a window pane is particularly important to avoid jamming if the regulator mechanism has but a single arm connected to the pane in an off-center position.

When the door structure supporting the window and associated elements is relatively thin, a lock element necessarily mounted in the door may occupy space otherwise needed for a portion of a glass run channel, and it becomes necessary to shorten one of the channels. If a gap is provided in the one channel to accomodate the lock element, the window pane withdrawn from the lower channel section during closing of the window may be difficult to introduce again into the lower channel section during opening of the window unless the supporting door structure is made very rigid and resistant to even minor deformation. A window pane will rattle when in the open position if mounted on a single regulator arm and guided on one side in a shortened glass run channel.

It is the primary object of this invention to provide a window arrangement of the type described which safely prevents rattling of the open window, yet does not require a supporting body structure of unusual rigidity, and may be operated by means of a single regulator arm.

With this object and others in view, as will hereinafter become apparent, the invention provides a window arrangement which includes the necessary supporting structure on which first and second channel members and a guide member are mounted. The channel members are elongated in a common direction and spaced transversely of this direction. A portion of the first channel member projects longitudinally beyond the second channel member. The guide member defines a guide groove spacedly aligned with the second channel member in the direction of elongation of the latter and coextensive in that direction with the projecting portion of the first channel member. A window pane simultaneously received in the channel members may be moved by an operating mechanism into and out of the guide groove.

Other features, additional objects, and many of the attendant advantages of this invention will readily be appreciated as the same becomes better understood by reference to the following detailed description of a preferred embodiment and of a modification thereof when considered in connection with the appended drawing in which:

FIG. 1 is a fragmentary, partly sectional, side-elevational view of a door on a passenger car equipped with a window arrangement of the invention;

FIG. 2 shows an element of the device of FIG. 1 as viewed in the direction of the arrow II; and FIG. 3 illustrates a modification of the element of FIG. 2 in a corresponding view.

Referring now to the drawing in detail, and initially to FIG. 1, there is shown only as much of a door in a passenger car as is necessary for an understanding of the invention, the non-illustrated portions of the door and other elements of the car being conventional.

The lower edge of the window pane 1 in the door carries a fixedly fastened horizontal track 2 engaged by a roller 4 at the free end of a window regulator arm 3, only partly shown. When a handcrank on the inside of the door is turned, the arm 3 is pivoted so that the roller 4 moves in a circular arc and raises or lowers the window pane 1, the point of attack of the arm 3 on the window pane 1 moving along the track 2 and being usually offset from the vertical median line of the pane 1.

To prevent tilting of the pane 1, its upright edges are received in two parallel glass run channels 5, 5' provided with respective fabric or rubber composition liners 7, 7', the channels and liners being U-shaped in cross section. The channels 5, 5' are fixedly fastened to the sheet metal of the door frame 8. The non-illustrated top ends of the channels 5, 5' are on a common level, but the channel 5 projects beyond the lower end of the channel 5' which is cut short to provide space for a lock 6, not shown in detail. In the illustrated, partly closed position, the window pane 1 barely projects beyond the lower end of the channel 5'.

The channel 5' is longitudinally aligned with a short guide member 9 which is a unitary zinc diecasting of U-shaped cross section and best seen in FIG. 2. Two flanges 12, 12' of the guide member 9 spacedly project in the same direction from the web 13 of the guide member so that the web and flanges bound a groove in the guide member 9. Two outwardly projecting locating pins 10 on the web 13 are received in bores of the door frame 8, and a single screw 11 passing through the frame 8 threadedly engages the web 13 to fasten the guide member to the supporting door structure.

The faces of the flanges 12, 12' and of the web 13 which bound the groove in the guide member 9 are partly parallel to the direction of movement of the pane 1 which is defined by the direction of elongation of the glass run channels 5, 5'. The face parts 14, 14' of the flanges 12, 12' and the face part 15 of the web 13 which bound the upper orifice of the groove are each obliquely inclined relative to the direction of window pane movement at a small acute angle so that the upper orifice of the groove flares in width and depth toward the spacedly adjacent lock element 6 and the lower end of the channel 5'. The liner 7' is as long as the liner 7. It bridges the gap between the glass run channel 5' and the guide member 9 and is received in the groove of the latter. Integral barbs 16, 16' projecting from the parallel faces of the flanges 12, 12' hardly impede downward insertion of the liner 7' into the groove of the guide member 9 during assembly of the window arrangement.

When the window pane 1 is lowered by the arm 3, one of its lateral edge portions is moved out of the glass run channel 5', but is protected adequately by the liner 7'. When the lower edge of the pane reaches the guide member 9, it is led into the groove of the guide member by the obliquely sloping face parts 14, 14', 15 even if the guide member 9 should be slightly misaligned relative to the glass run channel 5' because of minor warping of the supporting sheet metal in the door frame 8. The inserted pane 1 forces the barbs 16, 16' into the yieldably resilient liner 7'. When the window pane 1 is raised, the lower end of the liner 7' is safely retained in the guide member 9 by the barbs 16, 16'.

While the lower edge of the window pane 1 is located in the gap between the glass run channel 5' and the guide member 9, enough of the pane is guided in the channel 5' to avoid rattling or tilting by the arm 3 that could result in jamming. Sufficient guidance is provided by the member 9 for the further lowered window pane 1 to achieve the same result.

If the protection afforded by the liner 7' is not needed in the gap between the glass run channel 5' and the guide member 9, or if the space left by the lock element 6 is insufficient even for the liner, the liner may be cut off flush with the channel 5' in a manner not specifically illustrated, and the guide member 9 replaced by the similar guide member 9' shown in FIG. 3 which is a unitary molding of somewhat resilient plastic. It is attached to the supporting door structure by locating pins and a screw obscured in the view of FIG. 3

The groove in the guide member 9' bounded by two flanges 17, 17' and a web 13' flares over approximately one third of its length toward the upper orifice, terminal face parts 20, 20', 15' of the flanges and web of the member 9' being obliquely inclined relative to the direction of window pane movement, as described with reference to FIG. 2.

In the absence of the liner 7', the window pane is directly engaged by the lower two thirds of the flanges 17, 17' when the window is open. When in the relaxed condition shown in FIG. 3, the engaging portion 19 of the flange 17 convexly bulges into the groove. The resilient compressibility of the engaging portion 19 is enhanced by a slot 18 extending therethrough. When the edge of the window pane is received between the flanges 17, 17', the cross section of the slot 18 is sharply reduced as the illustrated convex face of the flange 17 is flattened by the pressure of the window pane. The resilient, stressed plastic in the modified guide member 9' safely prevents rattling of the open window pane.

A relatively soft plastic which does not require lubrication for moving contact with glass is the preferred material of construction for the guide member 9'. Harder plastic may be used to advantage instead of zinc diecasting alloy in making the guide member 9.

While the window arrangement of the invention has been described with reference to a door of a passenger vehicle, it solves a problem often existing is sliding windows arranged in fixed portions of an automobile body and in other vehicles where the two lateral glass channels of the window are of unequal length. Features other than a lock element may necessitate the shortening of one channel, and the space saving guide member of the invention cooperates with the coextensive, projecting portion of the other channel as effectively as an unavailable longer channel.

It should be understood, therefore, that the foregoing disclosure relates only to preferred embodiments of the invention and that it is intended to cover all changes and modifications of the examples herein chosen for the purpose of the disclosure which do not constitute departures from the spirit and scope of the invention set forth in the appended claims.

What is claimed is:

1. A window arrangement comprising:
   a. a support;
   b. first and second channel members mounted on said support,
      1. said channel members being elongated in a common direction and spaced transversely of said direction,
      2. a portion of said first channel member projecting beyond said second channel member in said direction;
   c. a guide member mounted on said support and defining a guide groove spacedly aligned with said second channel member in said direction and coextensive in said direction with said portion of said first channel member;
   d. a compressible, elongated liner member, respective longitudinal sections of said linear member being received in said second channel member and in said groove;
   e. barb means projecting from said guide member into said guide groove and engaging said liner member for impeding movement of the liner member toward said second channel member with greater force than movement of the liner member away from said second channel member;
   f. a window pane simultaneously received in said channel members; and
   g. operating means for moving said window pane in said direction into and out of said guide groove, one of said sections of said liner member being interposed between the window pane and said second channel member and the other section being interposed between said window pane and said guide member when said window pane is in said guide groove.

2. An arrangement as set forth in claim 1, wherein said second channel member and said guide member define a gap therebetween, the arrangement further comprising a lock element mounted on said door in said gap, said operating means including a single regulator arm connected to an off-center portion of said window pane in motion transmitting engagement during said moving of said window pane.

* * * * *